United States Patent
Copley et al.

(10) Patent No.: US 10,499,066 B2
(45) Date of Patent: Dec. 3, 2019

(54) METHOD AND APPARATUS FOR IMPROVING EFFICIENCY OF CONTENT DELIVERY BASED ON CONSUMPTION DATA RELATIVE TO SPATIAL DATA

(71) Applicant: Nokia Technologies Oy, Espoo (FI)

(72) Inventors: Devon Copley, San Francisco, CA (US); Daniel Andre Vaquero, Sunnyvale, CA (US); Esin Guldogan, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/487,574

(22) Filed: Apr. 14, 2017

(65) Prior Publication Data

US 2018/0302630 A1    Oct. 18, 2018

(51) Int. Cl.
  *G06T 1/20*        (2006.01)
  *H04N 19/172*    (2014.01)
  (Continued)

(52) U.S. Cl.
  CPC .......... *H04N 19/172* (2014.11); *G06F 3/013* (2013.01); *G06N 3/0445* (2013.01); *G06N 3/08* (2013.01);
  (Continued)

(58) Field of Classification Search
  CPC ....... H04N 19/172; G06F 3/013; H04L 67/22; H04L 67/322; G06T 1/20; G06T 2200/16; G06N 99/005
  (Continued)

(56) References Cited

U.S. PATENT DOCUMENTS

| 7,784,076 B2 * | 8/2010 | Demircin | H04N 19/172 |
| | | | 370/465 |
| 7,925,869 B2 * | 4/2011 | Kelsey | G06F 1/324 |
| | | | 712/220 |

(Continued)

FOREIGN PATENT DOCUMENTS

| EP | 1162830 | 12/2001 |
| WO | WO 2014/025319 | 2/2014 |
| WO | WO 2015/014773 | 2/2015 |

OTHER PUBLICATIONS

Bouten et al , Deadline-based approach for improving delivery of SVC-based HTTP adaptive streaming content (Year: 2014)*

(Continued)

*Primary Examiner* — Shan E Elahi
(74) *Attorney, Agent, or Firm* — Alston & Bird LLP

(57) ABSTRACT

A method, apparatus and computer program product are provided for improving the efficiency of content delivery based on consumption data. Consumption data may be collected from various users and/or devices describing frequently viewed areas in the content. The consumption data may be represented as a heat map. Variable encoding properties, caching priorities, and/or rendering priorities may be determined based on the consumption data. Content encoding and delivery may therefore be optimized accordingly. Machine learning may be applied to create predicted consumption data for content which lacks actual consumption data, allowing optimizations to be applied in advance of any actual consumption. Some concepts may be applied to unviewed video to optimize live streaming or the like.

20 Claims, 6 Drawing Sheets

(51) Int. Cl.
G06F 3/01 (2006.01)
H04L 29/08 (2006.01)
H04N 19/115 (2014.01)
H04N 19/162 (2014.01)
H04N 19/174 (2014.01)
G06N 3/04 (2006.01)
G06N 3/08 (2006.01)
G06N 20/00 (2019.01)

(52) U.S. Cl.
CPC ............ G06T 1/20 (2013.01); H04L 67/12 (2013.01); H04L 67/22 (2013.01); H04L 67/2847 (2013.01); H04L 67/2852 (2013.01); H04L 67/322 (2013.01); H04N 19/115 (2014.11); H04N 19/162 (2014.11); H04N 19/174 (2014.11); G06N 20/00 (2019.01); G06T 2200/16 (2013.01)

(58) Field of Classification Search
USPC .................................................. 375/240.01
See application file for complete search history.

(56) References Cited

U.S. PATENT DOCUMENTS

| | | | |
|---|---|---|---|
| 9,363,569 | B1 | 6/2016 | Van Hoff et al. |
| 9,554,085 | B2 | 1/2017 | Iyer et al. |
| 2012/0076204 | A1* | 3/2012 | Raveendran ..... H04N 21/23432 375/240.12 |
| 2012/0327243 | A1 | 12/2012 | Rezvani |
| 2013/0223537 | A1 | 8/2013 | Kasai et al. |
| 2013/0246643 | A1* | 9/2013 | Luby ............... H04N 21/23439 709/231 |
| 2014/0072048 | A1* | 3/2014 | Ma ..................... H04N 19/172 375/240.16 |
| 2014/0119437 | A1* | 5/2014 | Chen .................. H04N 19/597 375/240.12 |
| 2015/0063445 | A1* | 3/2015 | Rose ...................... G10L 19/24 375/240.03 |
| 2015/0188758 | A1* | 7/2015 | Amidei ............... H04L 41/0896 709/220 |
| 2015/0302644 | A1 | 10/2015 | Miller et al. |
| 2015/0341632 | A1* | 11/2015 | Syed .................. H04N 19/0006 375/240.03 |
| 2016/0047890 | A1* | 2/2016 | Ryan ........................ G01S 5/16 398/118 |
| 2016/0119747 | A1* | 4/2016 | Ryan ........................ G01S 5/16 398/118 |
| 2016/0119755 | A1* | 4/2016 | Ryan ........................ G01S 5/16 315/307 |
| 2016/0119756 | A1* | 4/2016 | Ryan ........................ G01S 5/16 398/118 |
| 2016/0119761 | A1* | 4/2016 | Ryan ........................ G01S 5/16 315/307 |
| 2016/0191931 | A1* | 6/2016 | Hannuksela ......... H04N 19/105 375/240.12 |
| 2016/0195604 | A1* | 7/2016 | Ryan ........................ G01S 5/16 398/118 |
| 2016/0195605 | A1* | 7/2016 | Ryan ........................ G01S 5/16 398/118 |
| 2016/0337426 | A1* | 11/2016 | Shribman ........... H04L 65/4084 |
| 2017/0262416 | A1* | 9/2017 | Rezgui ................. G06F 17/211 |
| 2017/0323481 | A1* | 11/2017 | Tran ..................... G06T 19/006 |
| 2018/0284746 | A1* | 10/2018 | Cella ................... G05B 23/024 |

OTHER PUBLICATIONS

Bao, Y. et al., *Shooting a Moving Target: Motion-prediction-based Transmission for 360-degree Videos*, IEEE International Conference on Big Data (Dec. 2016) 10 pages.
Carlier, A. et al., *Towards Characterizing Users' Interaction With Zoomable Video*, SAPMIA '10 (dated Oct. 29, 2010).
Qian, F. et al., *Optimizing 360 Video Delivery Over Cellular Networks*, AllThingsCellular '16 (Oct. 2016) 6 pages.
Understanding LSTM Networks, [online] [retrieved May 16, 2017]. Retrieved from the Internet: <http://colah.github.io/posts/2015-08-Understanding-LSTMs/>. (dated Aug. 27, 2015) 12 pages.
An Intro to FOVAS: Field of View Adaptive Streaming for Virtual Reality Pixvana, [online] [retrieved May 16, 2017]. Retrieved from the Internet: <https://web.archive.org/web/20170408162926/https://www.pixvana.com/intro-to-field-of-view-adaptive-streaming-for-vr/>. (Wayback Machine date Apr. 8, 2107) 7 pages.
Ghinea, G. et al., "An eye-tracking-based adaptive multimedia steaming scheme", 2009 IEEE International Conference on Multimedia and Expo, New York, NY, USA, pp. 962-965.
Khiem, N. et al., "Adaptive encoding of zoomable video streams based on user access pattern", Signal Processing: Image Communication, vol. 27, pp. 360-377 (2012) sections 1,3 and 4.4.
Ryoo, J. et al., "Design and evaluation of a foveated video streaming service for commodity client services", MMSys'16 (2016) Proceedings of the 7th International Conference on Multimedia Systems, Klagenfurt, Austria.
International Search Report and Written Opinion for International Application No. PCT/IB2018/052231 dated Jun. 26, 2018.

* cited by examiner

Fig. 5

METHOD AND APPARATUS FOR IMPROVING EFFICIENCY OF CONTENT DELIVERY BASED ON CONSUMPTION DATA RELATIVE TO SPATIAL DATA

TECHNOLOGICAL FIELD

An example embodiment of the present disclosure relates to electronic imagery and video content, and more particularly, to improving the efficiency of content delivery based on consumption data.

BACKGROUND

Virtual reality players, 360° viewers, and other virtual reality applications demand high resolution content to provide realistic effects and the feeling of user immersion in the environment. Displaying virtual reality content, spherical content, and other digital content at a high resolution and seamless user experience may not be technically feasible. Due to bandwidth constraints and other network limitations, attempting to deliver all the available content at a high resolution may result in performance issues such as high latency, choppy playback, and the like.

BRIEF SUMMARY

A method, apparatus, and computer program product are therefore provided for improving the efficiency of content delivery based on consumption data.

Certain example embodiments may use viewport dependent delivery methods to render content based on a direction the user is facing. A user's field of view may be limited while viewing virtual reality content, so in some examples, only the portions of the content being displayed in the viewport may need to be transmitted, providing an opportunity for bandwidth savings.

Example embodiments may also be applied to content delivery methods that are not necessarily viewport dependent. For example, in other content display systems, such as those with large display screens or immersive virtual reality settings, full frames of content may be transmitted for display, even though the user may realistically only view or focus on a subset or portion of the full frame at a given time.

Example embodiments may therefore direct any of the encoding, pre-fetch, caching, and rendering processes based on consumption data that describes not only the field of view of the user, but also which portions of the content are commonly viewed or are focal points of many users.

The consumption data may be represented in the form of a heat map, indicating which portions of video content are commonly viewed by viewers, and which portions are not viewed or are viewed infrequently. According to example embodiments, those portions commonly viewed may be encoded with higher quality settings and/or higher bitrates relative to portions that are infrequently viewed. The frequently viewed portions may also be pre-fetched, cached, and/or rendered with a higher priority than other portions.

Example embodiments further utilize consumption data to generate predictive consumption data for video content that has not yet been viewed by others, such as in the case of live video streaming. The variable quality and/or bitrate allocations, caching priorities, and rendering priorities may therefore also be applied based on predictive consumption of the unviewed content.

A method is provided, including receiving consumption data relative to spatial portions of content. The method further includes determining a value of at least one encoding property associated with at least one spatial portion of the content, wherein the encoding property value depends upon the consumption data, and wherein the at least one encoding property comprises at least one of a quality setting or bitrate. The method further includes encoding the content based on the at least one encoding property value.

In some examples, the consumption data comprises temporal consumption data relative to the spatial portions of the content and the method further comprises varying the at least one encoding property value by frame. The method may further include determining at least one of a caching priority or pre-fetching priority of the at least one spatial portion depending upon the consumption data. In some examples, the method may include determining a rendering priority of the at least one spatial portion depending upon the consumption data. In some examples, the consumption data is generated based on received viewing data associated with at least multiple users or multiple devices.

The method may include performing machine learning based on the consumption data to predict consumption data for other content, and tracking consumption data such that in an instance a consumption data criterion is satisfied, switching from using the predicted consumption data to actual consumption data.

In some examples, the consumption data is associated with previously viewed frames of the content from at least one of multiple users or multiple devices. The method may further include determining predicted consumption data of unviewed frames of the content based on at least content of the unviewed frames and the consumption data associated with the previously viewed frames.

An apparatus is also provided. The apparatus may include at least one processor and at least one memory including computer program code, the at least one memory and the computer program code configured to, with the processor, cause the apparatus to at least receive consumption data relative to spatial portions of content, and determine a value of at least one encoding property associated with at least one spatial portion of the content, wherein the encoding property value depends upon the consumption data, and wherein the at least one encoding property comprises at least one of a quality setting or bitrate. The at least one memory and the computer program code are further configured to, with the processor, cause the apparatus to encode the content based on the at least one encoding property value.

A computer program product is provided, comprising at least one non-transitory computer-readable storage medium having computer-executable program code instructions stored therein, the computer-executable program code instructions comprising program code instructions to receive consumption data relative to spatial portions of content. In some examples, the computer-executable program code instructions further comprise program code instructions to determine a value of at least one encoding property associated with at least one spatial portion of the content, wherein the encoding property value depends upon the consumption data, and wherein the at least one encoding property comprises at least one of a quality setting or bitrate, and to encode the content based on the at least one encoding property value.

An apparatus is also provided, with means for including receiving consumption data relative to spatial portions of content. The apparatus further includes means for determining a value of at least one encoding property associated with at least one spatial portion of the content, wherein the encoding property value depends upon the consumption data, and wherein the at least one encoding property comprises at least one of a quality setting or bitrate. The apparatus further includes means for encoding the content based on the at least one encoding property value.

BRIEF DESCRIPTION OF THE DRAWINGS

Figure 1:
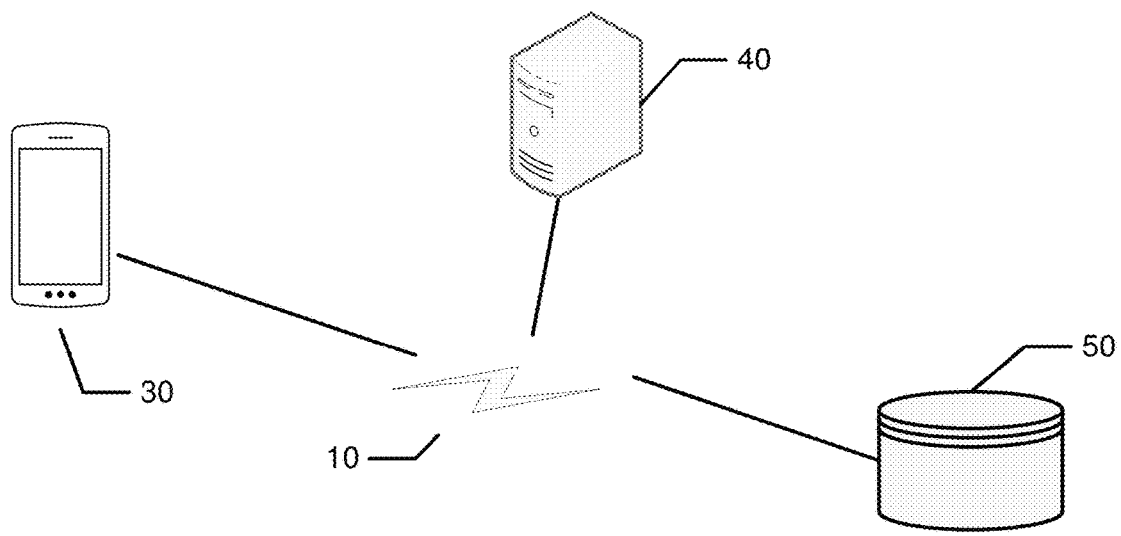
Figure 2:
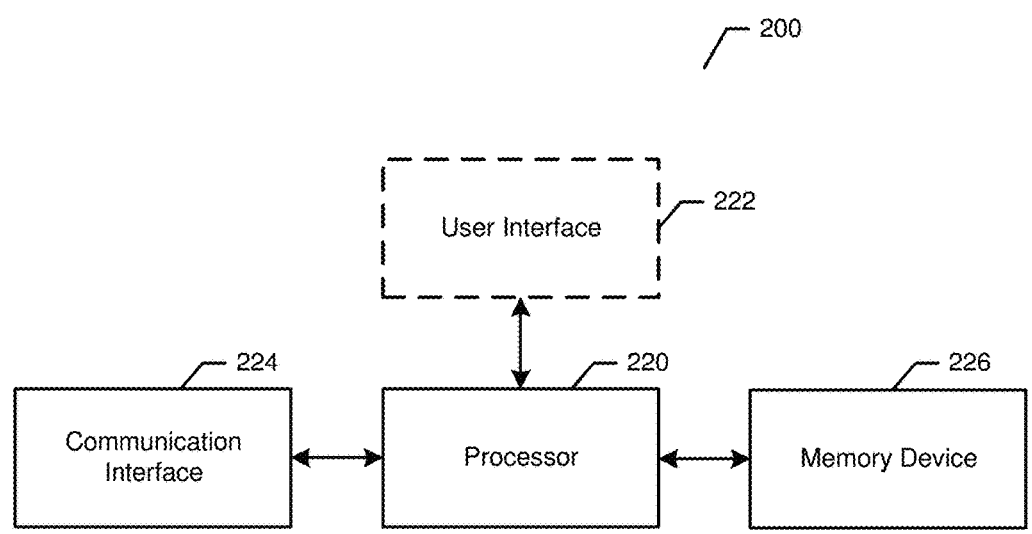
Figure 3:
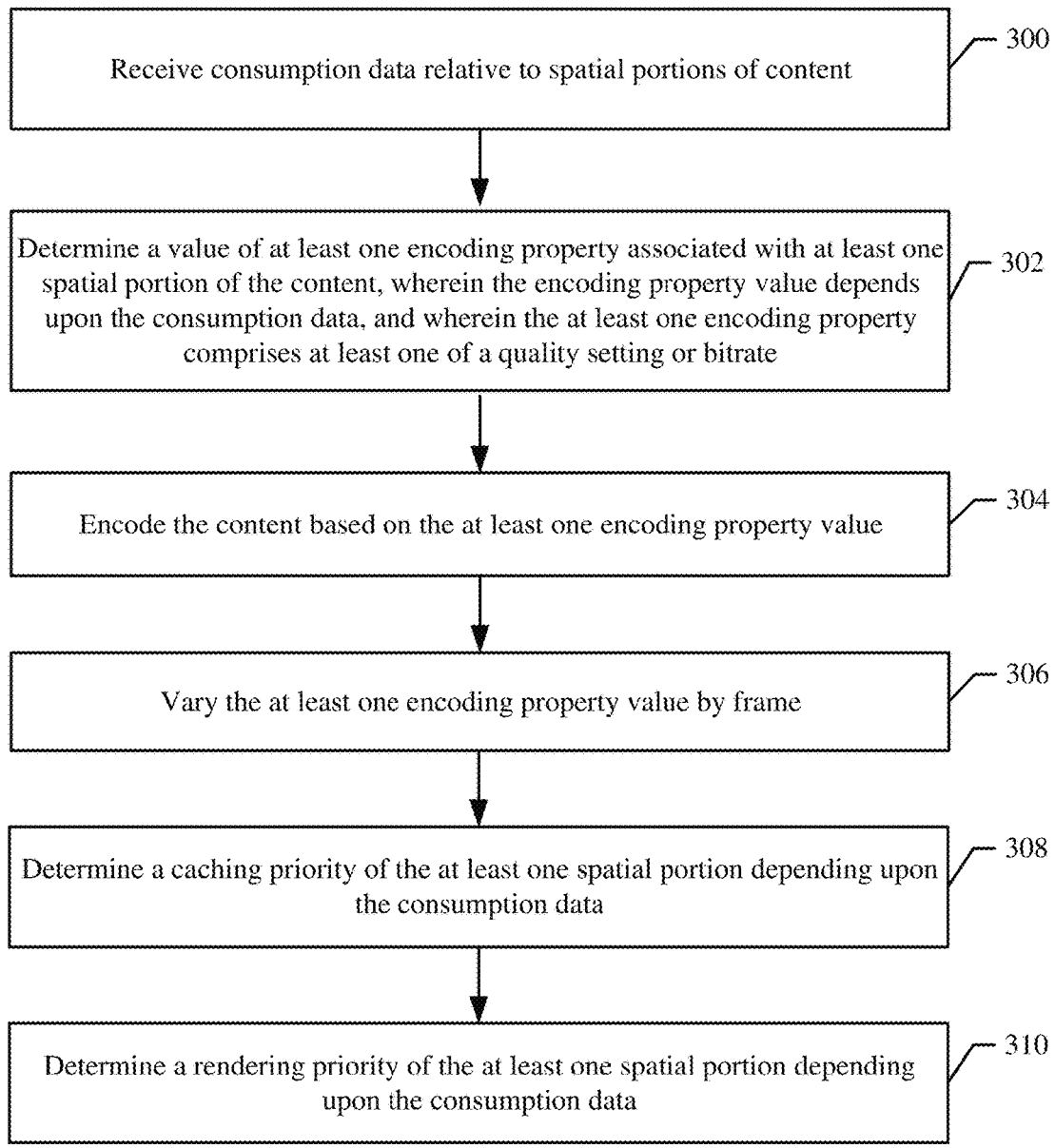
Figure 4:
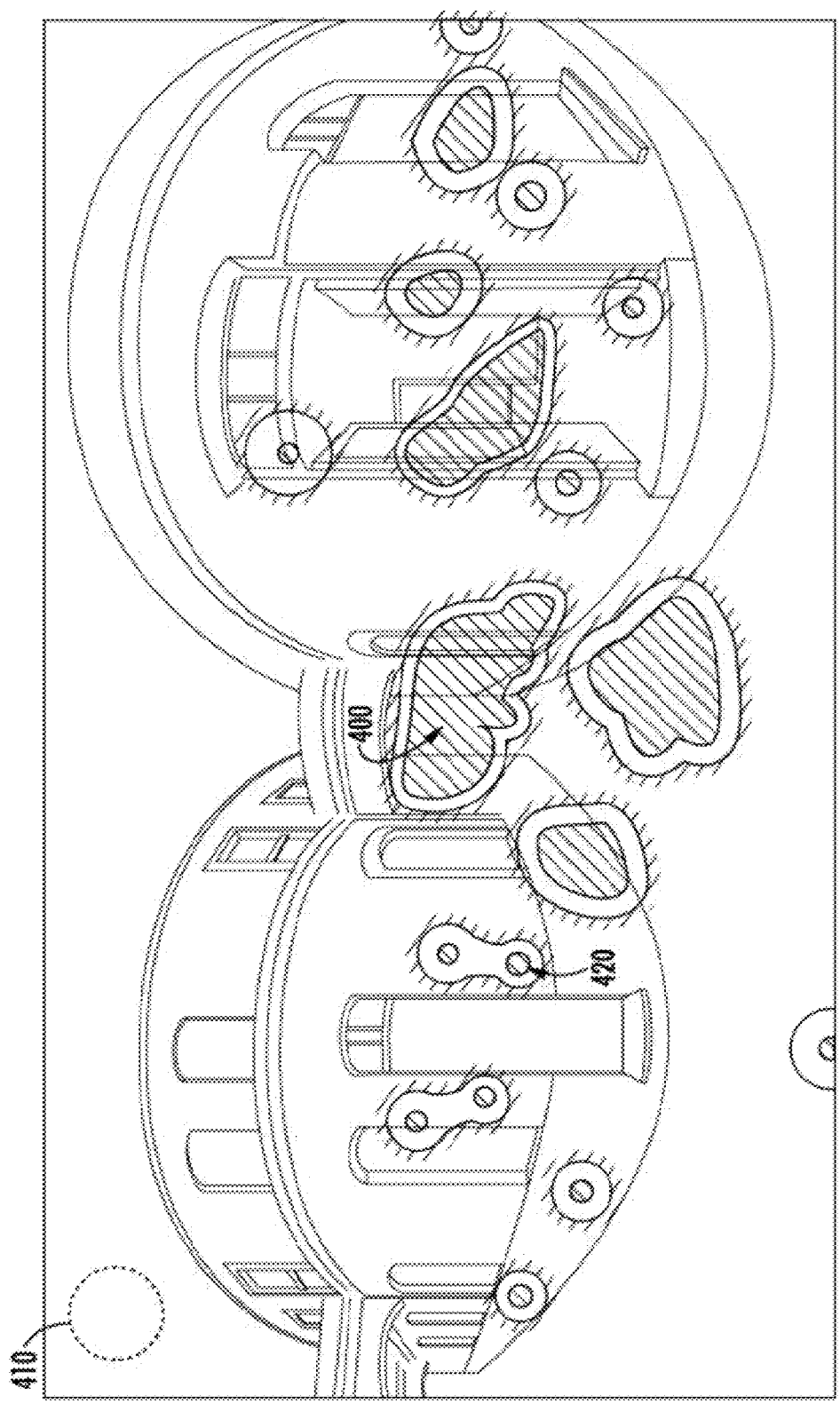
Figure 6:
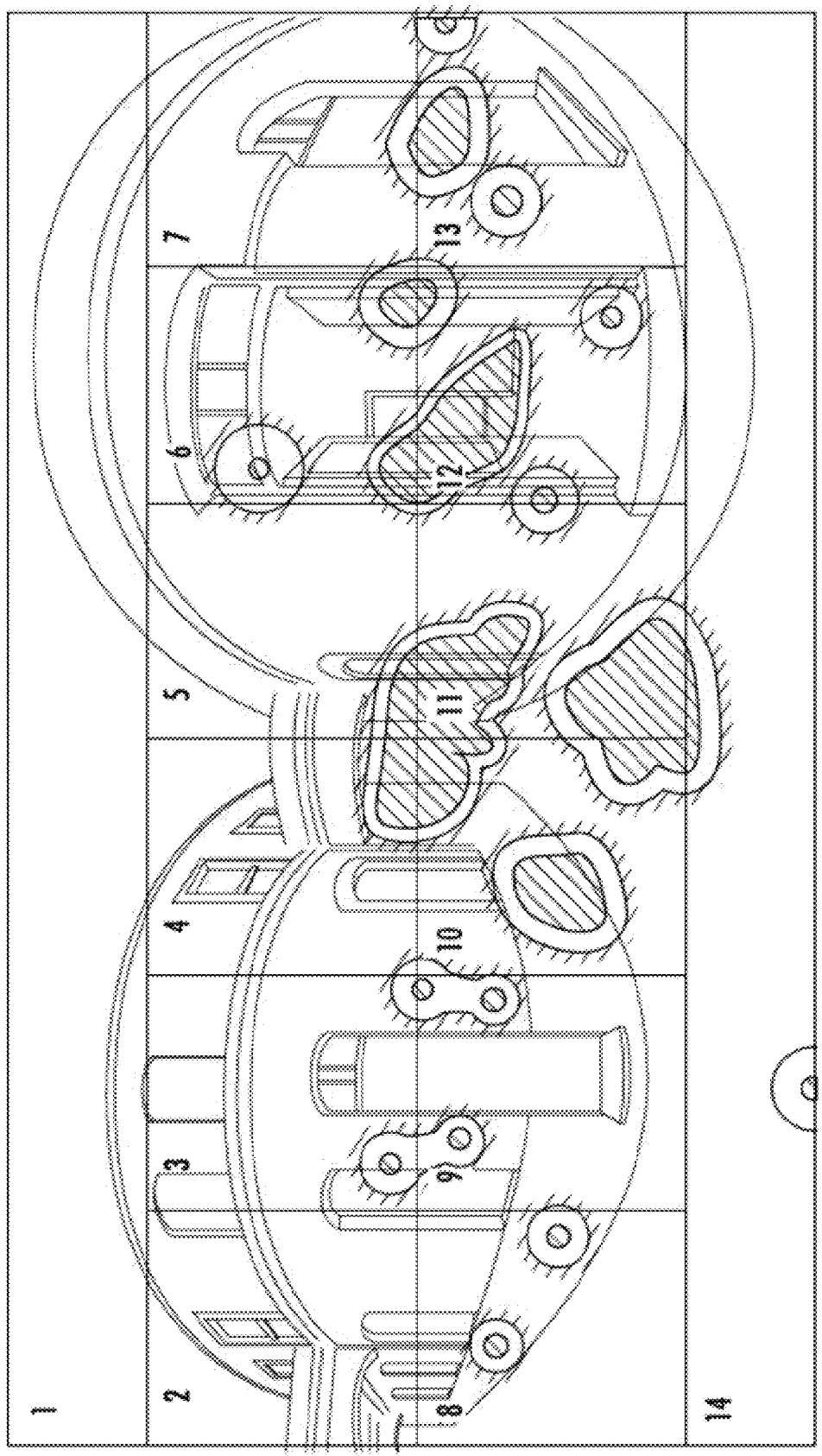
Figure 7:
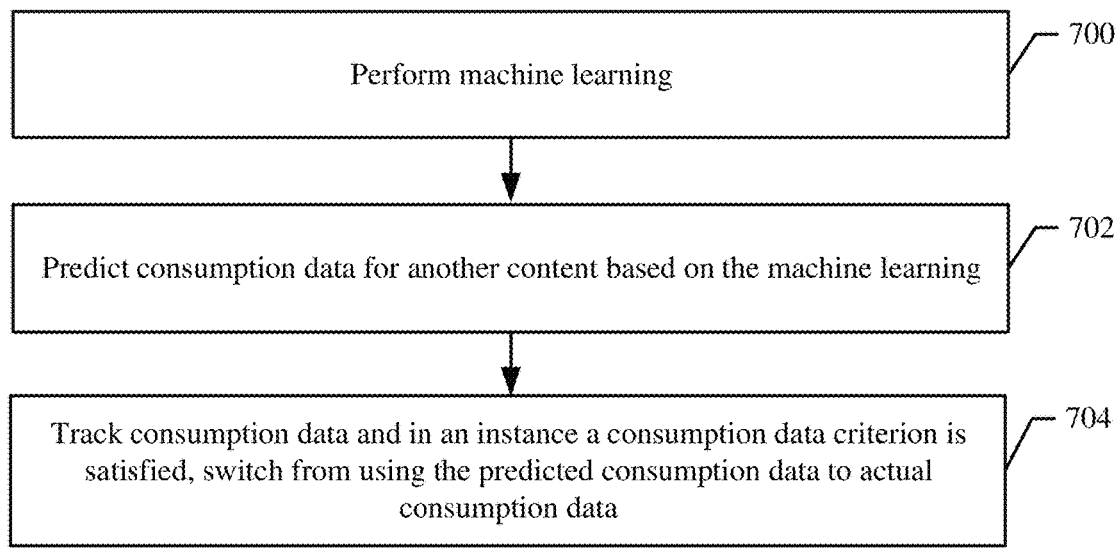
Figure 8:
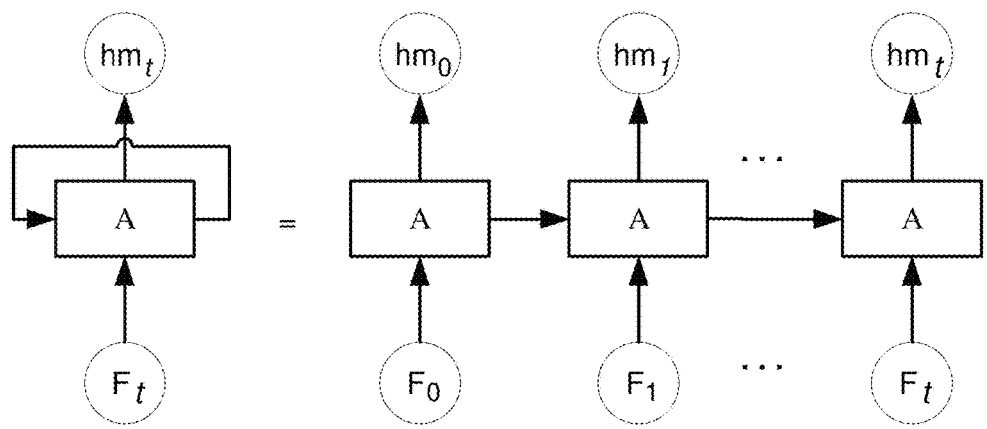

Having thus described certain example embodiments of the present invention in general terms, reference will hereinafter be made to the accompanying drawings which are not necessarily drawn to scale, and wherein:

FIG. 1 is an overview of a system that can be used to practice certain embodiments described herein;

FIG. 2 is an exemplary schematic diagram of an apparatus in accordance with some example embodiments;

FIG. 3 is a flowchart of operations that may be performed in accordance with an example embodiment;

FIG. 4 illustrates an exemplary heat map overlaying a video frame in accordance with some example embodiments;

FIG. 5 illustrates an exemplary layout of spatial portions in accordance with some example embodiments;

FIG. 6 illustrates an exemplary layout of spatial portions overlaying an exemplary heat map and video frame in accordance with some example embodiments;

FIG. 7 is a flowchart of operations that may be performed in accordance with an example embodiment; and FIG. 8 illustrates an exemplary recurrent neural network for machine learning according to example embodiments.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

As described below, a method, apparatus and computer program product are provided for improving the efficiency of content delivery based on user consumption data. In this regard, any reference made herein to content, video content or frames should be considered non-limiting and may further include other electronic imagery and/or other digital content. For example, the content may include a movie, or a scene such as a remotely captured live scene, still imagery, or other digital content. The delivery of such content may comprise any operations performed by example embodiments to prepare the digital content for display on a device, or to cause display of the digital content on a device. For example, the delivery of content may include, but is not limited to, encoding content, transmitting content, rendering content, and/or the like. Consumption data may include any data or information used to describe viewing habits of users viewing the content, and may include information relating to a heat map indicating viewing frequencies of various spatial portions of the content.

Overview

FIG. 1 is an overview of a system that can be used to practice certain embodiments described herein, and should not be considered limiting. As illustrated in FIG. 1, example embodiments may be implemented as or employed in a distributed system. The various depicted components may be configured to communicate over a network 10, such as the Internet, for example, or any other communication interface as described in further detail hereinafter. In general, user device(s) 30 may be configured to communicate with a server 40 and/or database 50. User device 30 may include any computing device such as a smart phone, laptop, tablet, personal computer laptop and/or the like, and may be used to view content, capture content, capture consumption data, and/or the like. In some examples, any number of user devices 30 may be configured to communicate with server 40, which may be configured to receive captured or recorded content from user device 30, provide content to the user device 30, receive, process and/or maintain consumption data, and/or the like. The server 40 may be communicatively connected to database 50 which may be configured to store content, consumption data, and/or the like. The user device 30, server 40 and/or database 50 may be configured to perform any of the operations described herein.

The system of FIG. 1 described above is provided merely as an example implementation and it will be appreciated that the example embodiments provided herein may be implemented as or employed by any number of system architectures.

Referring now to FIG. 2, apparatus 200 is a computing device(s) configured for improving the efficiency of content delivery based on user consumption data according to example embodiments. Apparatus 200 may at least partially or wholly embody any of the network 10, user device 30, server 40, and/or database 50 described above.

Referring to FIG. 2, apparatus 200 may include or otherwise be in communication with processor 220, user interface 222, communication interface 224, and memory device 226. The user interface 222 may be considered optional in apparatus 200, as indicated by the dashed line. For example, when apparatus 200 is embodied as server 40, user interface 222 may not be present.

In some examples, apparatus 200 may include a wide variety of devices including personal computers, work stations, or mobile terminals, such as laptop computers, tablet computers, smartphones, wearable devices (e.g., head-worn devices), or any combination of the aforementioned, and other types of voice and text communications systems. In some examples, apparatus 200 may be embodied by a user device, such as user device 30, comprising the display on which content is provided to a user. Additionally or alternatively, apparatus 200 may be embodied by a server, such as server 40, for processing video content and/or for improving the efficiency of delivery of the content, which in turn, may be reflected on a user interface display of another device.

In some embodiments, the processor 220 (and/or co-processors or any other processing circuitry assisting or otherwise associated with the processor 220) may be in communication with the memory device 226 via a bus for passing information among components of the apparatus 200. The memory device 226 may include, for example, one or more volatile and/or non-volatile memories. In other words, for example, the memory device 226 may be an electronic storage device (e.g., a computer readable storage medium) comprising gates configured to store data (e.g., bits) that may be retrievable by a machine (e.g., a computing device like the processor 220). The memory device 226 may be configured to store information, data, content, applications, instructions, or the like for enabling the apparatus to carry out various functions in accordance with an example embodiment of the present invention. For example, the memory device 226 may store video content and/or consumption data relating to the video content. As another example, the memory device 226 could be configured to buffer input data for processing by the processor 220. Additionally or alternatively, the memory device 226 could be configured to store instructions for execution by the processor 220. In some embodiments, memory device 226 may comprise or embody database 50.

In some embodiments, the apparatus 200 may be embodied as a chip or chip set. In other words, the apparatus 200 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 200 may therefore, in some cases, be configured to implement an embodiment of the present invention on a single chip or as a single "system on a chip." As such, in some cases, a chip or chipset may constitute means for performing one or more operations for providing the functionalities described herein.

The processor 220 may be embodied in a number of different ways. For example, the processor 220 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 220 may include one or more processing cores configured to perform independently. A multi-core processor may enable multiprocessing within a single physical package. Additionally or alternatively, the processor 220 may include one or more processors configured in tandem via the bus to enable independent execution of instructions, pipelining and/or multithreading.

In an example embodiment, the processor 220 may be configured to execute instructions stored in the memory device 226 or otherwise accessible to the processor 220. Alternatively or additionally, the processor 220 may be configured to execute hard coded functionality. As such, whether configured by hardware or software methods, or by a combination thereof, the processor 220 may represent an entity (e.g., physically embodied in circuitry) capable of performing operations according to an embodiment of the present invention while configured accordingly. Thus, for example, when the processor 220 is embodied as an ASIC, FPGA or the like, the processor 220 may be specifically configured hardware for conducting the operations described herein. Alternatively, as another example, when the processor 220 is embodied as an executor of software instructions, the instructions may specifically configure the processor 220 to perform the algorithms and/or operations described herein when the instructions are executed. However, in some cases, the processor 220 may be a processor of a specific device (e.g., a mobile terminal or network entity) configured to employ an embodiment of the present invention by further configuration of the processor 220 by instructions for performing the algorithms and/or operations described herein. The processor 220 may include, among other things, a clock, an arithmetic logic unit (ALU) and logic gates configured to support operation of the processor 220.

Meanwhile, the communication interface 224 may be any means such as a device or circuitry embodied in either hardware or a combination of hardware and software that is configured to receive and/or transmit data from/to a network and/or any other device or module in communication with the apparatus 200. In this regard, the communication interface 224 may include, for example, an antenna (or multiple antennas) and supporting hardware and/or software for enabling communications with a wireless communication network. Additionally or alternatively, the communication interface 224 may include the circuitry for interacting with the antenna(s) to cause transmission of signals via the antenna(s) or to handle receipt of signals received via the antenna(s). In some environments, the communication interface 224 may alternatively or also support wired communication. As such, for example, the communication interface 224 may include a communication modem and/or other hardware/software for supporting communication via cable, digital subscriber line (DSL), universal serial bus (USB) or other mechanisms. Communication interface 224 may include a network (e.g., network 10), such as any wired or wireless communication network including a local area network (LAN), personal area network (PAN), wide area network (WAN), the Internet, an intranet, or the like, as well as any attendant hardware, software and/or firmware required to implement said networks (e.g. network routers and network switches). The communication interface 224 may be configured to facilitate communication between apparatus 200 and other devices. For example, communication interface 224 may enable communication between user device 30, server 40, and/or database 50.

In some embodiments, such as when apparatus 200 is embodied as user device 30, a user interface 222 may be present. The user interface 222 may be configured to cause provision of any audible, visual, mechanical or other output to the user. As such, the user interface 222 may include a display, such as one configured for displaying an image or video. Example displays which may be included in user interface 222 may include a computer monitor, tablet screen, television monitor, head-worn display, other wearable display, a display or plurality of displays providing a virtual reality environment, and/or the like. In some examples, user interface 222 may include additional output mechanisms.

The user interface 222 may include a means for user input, such as a keyboard, mouse, joystick, touch screen, touch areas, scroller ball, soft keys, a microphone, ringer, speaker, or other input mechanisms. In some examples, the user interface 222 may include or be communicatively connected to any number of sensors, such as an accelerometer configured to detect movement of a wearable device, handheld device, or other device, such that the user may provide inputs based on such movements. For example, a user may turn their head while wearing a head-worn device comprising a display to view other areas of displayed content. User interface 222 may include eye-tracking sensors to determine which portions of content are viewed by a user. The user inputs via user interface 222 may therefore be processed and converted to consumption data. In some embodiments, the user interface 222 may include a camera for capturing or recording video content which may be processed and/or provided by example embodiments.

In some examples, the processor 220 may comprise user interface circuitry configured to control at least some functions of one or more of the aforementioned user interface elements. The processor 220 and/or user interface circuitry comprising the processor 220 may be configured to control one or more functions of one or more user interface elements through computer program instructions (e.g., software and/or firmware) stored on a memory accessible to the processor 220 (e.g., memory device 226, and/or the like). In some examples, user interface 222 may be embodied by a user device that is remote from or external to apparatus 200.

Consumption Based Content Delivery

FIG. 3 is a flowchart of operations performed by apparatus 200 according to an example embodiment. As shown by operation 300, apparatus 200 may include means, such as the processor 220, user interface 222, communication interface 224, memory device 226, or the like, for receiving consumption data relative to spatial portions of content. As introduced above, in some embodiments, content may be immersive (e.g., 360-degree or spherical). Consumption data may include any data or information used to describe which portions of the content have been viewed by a user or multiple users, and/or via the same device or other devices. Consumption data may include areas of focus within a viewfinder or viewport. Apparatus 200 may receive consumption data from numerous user devices 30 based on user head rotation, eye tracking, and/or gaze tracking, for example. Consumption data may be captured via any sensors operative on a user device 30 with which a user views the content. For example, head motion data may be tracked from an accelerometer or other type sensor. Eye tracking sensors may also be configured to track which portions of content on a large display area are frequently viewed by users. Also, in desktop-based virtual reality players, it is possible to track the viewports seen by the user in the absence of accelerometers or eye tracking sensors, by tracking the viewing area selected by the user through mouse scrolling, touch screen panning, and/or the like. The frequency rate at which movement data is detected may vary amongst devices, but regardless of specific implementations, consumption data may be collected from numerous user devices and tracked for a particular video asset or content. The consumption data may be received or compiled by apparatus 200, and maintained over time.

The consumption data may be associated with a spatial portion identified or characterized in a variety of ways. In general, the portions of content are described as spatial portions to specify that the portions relate to pixels, grouping of pixels, and/or the like. The spatial portions may be further associated with portions of the content according to a projection format with which the content renderer renders a spherical image into a two-dimensional frame. Some example projection formats are described in further detail below.

In some embodiments, consumption data may include or may be represented by a heat map. A heat map provides a detailed visual representation of the consumption data. Example embodiments may aggregate the consumption data describing viewing directions and/or focus of multiple viewers to create heat maps indicating the spatial portions of the content which attract the most (and/or least) attention from viewers. The heat map may therefore provide more information than the viewport information alone. The heat map additionally provides detail regarding the frequency of view, or attention given to particular spatial portions or focal points within a field of view or viewport. The consumption data may be based on time measurements or durations spent by various users viewing different spatial portions of the content. The consumption data may include data indicating frequently or less frequently viewed spatial portions. Although the term heat map is indicative of a visual representation of consumption data, the term heat map may also be used to generally refer to consumption data relating to spatial areas of content.

FIG. 4 illustrates an example heat map superimposed or overlaid on a frame of content (e.g., a frame of video content). Spatial area 400, characterized by "hot spots" or dark shading, indicates a relatively high number of viewers focusing on the area and/or more frequent viewing, relative to spatial areas 420 and 410. As another example, spatial area 420 comprises a darkly shaded portion (smaller than that of spatial area 400), surrounded by lighter shading. The smaller size and/or lighter shading of spatial portion 420 indicates, relatively fewer viewers focusing on the area in comparison to viewers of spatial area 400. Spatial portion 410 includes no shading, and indicates that either no viewers have viewed the area, or very few viewers have viewed the area.

As introduced above, the received consumption data may be associated with spatial portions that represent the pixels reflected in a heat map. Additionally or alternatively, the consumption data may be further associated with spatial portions defined or identified based on a projection format utilized or implemented to render an image. For example, a particular projection format may be used to project a spherical image into two-dimensional frames, such as may be presented by virtual reality goggles or a head worn device. Other projection formats may be used depending on the particular implementation and/or type of display.

FIG. 5 illustrates a layout of spatial portions according to an example embodiment. As illustrated in FIG. 5, an equirectangular projection may be used to divide a frame into spatial portions which may be referred to as tiles. The spatial portions or tiles may be encoded and transmitted over a network (in some embodiments, as separate bit streams), and therefore may each be encoded with differing settings. Similarly, different spatial portions may be cached, and/or pre-fetched based on differing priorities. The term "tile" may be used herein as referring to a spatial portion of content, and is not intended to be limiting.

Equirectangular projection is one example of a projection that may be used in viewport-dependent embodiments. In this regard, some example embodiments may vary encoding, caching priority, pre-fetching priority, rendering priority and/or the like based on content that is provided or expected to be provided within the user's viewport. For example, content falling outside of the viewport for a particular user and at a given time may have lower quality settings, and/or the like while content inside the viewport may be associated with higher quality settings. Similar applications may be made to full-frame displays based on what the user is likely to view as indicated by consumption data.

An equirectangular projection is therefore an example of a projection format that may be used to divide content into a plurality of spatial portions or tiles and it will be appreciated that a variety of projection formats may be used according to example embodiments. For example, cubemap projection, Lambert conformal conic projection, and assymetric projection are examples of other projection formats that may be used according to example embodiments.

In the asymmetric projection approach, for example, rather than encoding separate tiles or spatial portions, example embodiments may encode different variants of the full frame, with each variant having full resolution only in a portion of the sphere or frame. The different variants may therefore be associated with various spatial portions.

Accordingly, the example embodiments described herein may be utilized irrespective of projection format. In some examples, however, spatial portions may be impacted by a projection format and/or the corresponding approach by which content is mapped from a virtual reality environment (e.g., sphere) to a plane. For example, some projection formats may dictate how the spatial portions of content are divided.

FIG. 5 is therefore provided merely as an example, and it will be appreciated that any shape, distribution, and/or number of spatial portions (e.g., tiles, variants), may be used. Apparatus 200 may therefore include means, such as with processor 220, for determining a distribution or layout of spatial portions. FIG. 5 illustrates a layout including a total of 14 tiles, numbered 1-14, and covering a video frame. The tiles span content that can be associated with a 360 degree field of view, but in some example embodiments, a user may view or focus on a subset of the data at a given time.

As shown by overlaying the layout onto the heat map as illustrated in FIG. 6, the consumption data may be associated with the spatial portions. Tiles 10, 11, and 12 may be identified by apparatus 200 as being associated with frequently consumed areas due to the large portion of dark areas or hot spots. Tiles 1 and 2 may be associated with infrequently viewed spatial portions, or spatial portions having no or little consumption. Some other tiles, such as tile 6, are associated with consumption levels falling relatively in between the consumption levels of tiles 10, 11 and 12, and tiles 1 and 2. Accordingly, example embodiments may determine consumption data for a particular tile. Using the above example, tiles 10, 11 and 12 may be considered frequently viewed tiles and tiles 1 and 2 may be considered infrequently viewed tiles.

In some examples, the layout may be dynamic based on the consumption data. Some example embodiments may generate more granular layouts (e.g., layouts having more spatial portions) than what is illustrated in FIGS. 5 and 6 to enable further distinction between consumption levels amongst the spatial portions. However, any number of spatial portions may be used according to example embodiments.

As shown by operation 302, apparatus 200 may include means, such as the processor 220, memory device 226, or the like, for determining a value of at least one encoding property associated with at least one spatial portion of the content, wherein the encoding property value depends upon the consumption data, and wherein the at least one encoding property comprises at least one of a quality setting or bitrate.

According to certain embodiments, each spatial portion (e.g., tile) may be encoded as a separate bit stream with independently variable quality and/or bitrate settings based on the consumption data associated with the spatial portion. In some embodiments, a motion-constrained encoding option within a high efficiency value (HEVC) codec could be used such that differential encoding properties are associated with different spatial portions, even though the output of the encoding process may actually be packaged into a single bit stream.

Apparatus 200 may process the consumption data (e.g., heat map) to determine encoding properties, such as quality settings and/or bit rate allocations.

The quality setting may include various settings. The quality setting may include resolution, for example, such that a high resolution is used for high-consumption areas, and relatively lower resolutions are used for lower-consumption areas. Other examples of quality settings that may be determined based on the consumption data may include determining to use bi-directional encode frames, determining a minimum key frame interval, and/or a per-macroblock bitrate-control look-ahead setting. In this regard, the value of an encoding property may be considered 1 or 0 or on or off.

The aforementioned quality settings are provided merely as an example, and it will be appreciated that any quality setting, such as any setting that impacts encoding complexity, processing time, and/or target bitrate, for example, may be determined based on the consumption data.

According to example embodiments, a variable bit rate may be determined. A bitrate may be higher for frequently viewed spatial portions, and relatively lower for spatial portions viewed less frequently.

As shown by operation 304, apparatus 200 may include means, such as the processor 220, communication interface 224, memory device 226, or the like, for encoding the content based on the at least one encoding property value. The encoding property value(s) may be variable based on the consumption data, as described above. Apparatus 200 may encode the content based on the determined values. As such, a spatial portion of the content which corresponds to high-consumption areas may be encoded at higher quality and/or bitrate, and less commonly-viewed spatial portions may be encoded using lower quality and/or bitrate.

In some embodiments, the variable encoding may occur during a re-encoding process. In this regard, the content may be initially encoded to be delivered to viewers and to obtain the consumption data. Then, once consumption data is collected, the content may be re-encoded (such as from the original source, for example), with variable encoding settings based on the consumption data as described herein. For simplicity, the re-encoding may be referred to herein as encoding. It will be appreciated that in some embodiments, such as with respect to predictive consumption data (described in further detail below), the variable encoding may be applied in an initial encoding process and may therefore not be considered re-encoding.

According to example embodiments, the consumption data may comprise temporal consumption data relative to the spatial portions of the content. For example, as video content is provided to a user, such as a user of a wearable device, the user may move their head over time as the video is played and view different spatial portions at different times associated with the content, or during different frames. Similarly, a viewer of a large display screen may turn their focus to different areas.

As such, at operation 306, apparatus 200 may include means, such as the processor 220, communication interface 224, memory device 226, or the like, for varying the at least one encoding property value by frame. The heat map illustrated in FIG. 6 may be for a given frame, but may change from frame to frame of the content. In this regard, apparatus 200 may vary the value of encoding properties for various spatial portions, further based on time-based consumption data, or on a frame by frame basis (or by some other number of frames). In this regard, example embodiments use consumption data for encoding content as the consumption data changes. The variably determined encoding properties may allow for higher quality presentation while limiting bandwidth usage.

At operation 308, apparatus 200 may include means, such as the processor 220, user interface 222, communication interface 224, memory device 226, or the like, for determining a caching priority and/or pre-fetching priority of a spatial portion of the content depending upon the consumption data. Based on similar consumption data as described above, apparatus 220 may set variable caching priorities and/or pre-fetching for different spatial portions and/or associated spatial portions.

Pre-fetching may refer to the apparatus 200 causing transfer of data (e.g., content) within a content delivery network (CDN) from a database, repository, and/or the like to temporary storage accessible by a server, for example, prior to transmission of the data to a user device. In this regard, pre-fetching may be considered driven by a client-side user device.

Caching may refer to apparatus 200 causing data to be stored locally on memory of the user device prior to rendering by on a user device. In this regard, the data may be cached for re-use so the data may not need to be retrieved from a remote device multiple times, thereby improving efficiency.

Additionally or alternatively, caching may refer to a network-side analog of a pre-fetching operation. For example, a network traffic manager may push certain segments out to leaf nodes of the CDN in advance of user requests, and in some embodiments persist them, based on the consumption data indicating that specific spatial portions may be frequently viewed. In some examples, this caching may be referred to as "pre-caching," but may be referred to herein as caching. In some examples, only frequently-used spatial portions of content might be pre-fetched, cached, pre-cached in order to reduce or minimize storage costs, as opposed to pre-fetching, caching, and/or pre-caching all available content.

Apparatus 200 may therefore determine variable caching priorities and/or pre-fetching variable to reduce latency. According to example embodiments, latency may be a common side-effect or challenge in delivering video content, and particularly high quality video content. Apparatus 200 may therefore determine a caching and/or pre-fetch priority (e.g., numeral ranking, or high, medium and low indicators, for example) based on the consumption data. For example, a spatial portion (e.g., tile) associated with high consumption may be assigned a high caching priority and/or pre-fetch priority, and spatial portions associated with relatively lower consumption may be assigned a relatively lower caching priority and/or pre-fetch priority. Apparatus 200 may therefore include means for directing various components (e.g., communication interface 224, processor 220, and/or memory device 226) or devices (e.g., user device 30, server 40, and/or database 50) to pre-fetch and/or cache the content according to the priorities.

In some viewport dependent formats, caching priority and/or pre-fetching priority may be based on whether or not the spatial portion is associated with an area displayed within a viewport, or is determined as likely being displayed in the viewport. In some examples, content that is not yet included in a displayed viewport may be pre-fetched and/or cached. For instance, content not yet viewed may be pre-fetched or cached in anticipation of a user turning their head such that the content may come into view. In some examples, highly consumed spatial portions may be pre-fetched and/or cached.

According to some embodiments, spatial portions associated with high consumption may be cached and/or pre-fetched in advance of a user request. The caching priorities and/or pre-fetching priorities may be determined based on the consumption data received based on provision of the content for multiple users and/or devices.

The time-based consumption data may also be applied to caching and/or pre-fetching priorities such that as the consumption data changes over frames, the caching priorities of particular spatial portions may change accordingly.

At operation 310, apparatus 200 may include means, such as the processor 220, user interface 222, communication interface 224, memory device 226, or the like, for determining a rendering priority of a spatial portion of the content depending upon the consumption data. Apparatus 220 may determine variable rendering priorities for different spatial portions according to the consumption levels of associated spatial areas.

For example, a spatial portion associated with frequently consumed spatial areas may be assigned a higher rendering priority, and a spatial portion associated with spatial areas with relatively lower consumption may be assigned a relatively lower rendering priority. The user device 30 may render the various portions accordingly.

A rendering priority may include, for example, display resolution and/or frame rate. For example, frequently viewed spatial portions may be displayed with a relatively higher resolution and/or higher update rates, relative to less frequently viewed spatial portions.

Time-based consumption data may also be applied to rendering priorities such that as the consumption data changes over frames, the rendering priorities of particular spatial portion may change accordingly.

The above operations may be performed for any video asset. According to some embodiments, for content that may be stored and streamed on-demand to various users, consumption data can be collected for each new view of the video. As the consumption data is collected, apparatus 200 (e.g., server 40), may aggregate the consumption data from all users or a subset of users, and update a heat map for each frame of the video. As the heat maps are updated, the video can then be re-encoded (using tiles or asymmetric projection, for example) with quality settings and bit rate allocations based on the updated consumption data. This may enable optimized delivery for subsequent users that request the content. The encoding may continue to be repeatedly optimized as new consumption data relating to users is received.

Based on the above, some example embodiments may apply consumption data received from other viewers when initially preparing video content for delivery to a new viewer. Once the new viewer starts viewing the content, consumption data from the new viewer may be collected and aggregated such that the consumption data evolves over time. As such, as more consumption data for a particular video asset is received, the operations of FIG. 3 may be repeated. In some examples, as more data is collected, the consumption data may be considered to be more accurate.

Predicting Consumption Data

FIG. 7 is a flowchart of operations performed by apparatus 200 according to an example embodiment for predicting consumption data. While FIG. 3 provides operations for improving the efficiency of delivery of content that has been viewed by other users, based on actual user consumption data of the same content, FIG. 7 provides operations for improving the efficiency of content delivery of content that has not necessarily been viewed by any other users, has been viewed by a relatively small number of users, or has no associated consumption data available. In this regard, FIG. 7 provides operations for predicting consumption data.

Apparatus 200 may utilize consumption data relating to other video content to learn and predict future consumption of unviewed data. For example, when apparatus 200 provides streaming of a live event to viewers, there may be no actual consumption data available relating to the live feed. The operations of FIG. 7 may be used to improve the efficiency of delivery of this content as described below by predicting the consumption data for the new video asset. As referred to herein, "unviewed" content or "new" content may be used to refer to content for which only a small number of viewers have viewed the content and/or for which only a relatively small amount of consumption data has been collected, and the terms "unviewed" or "new" are not intended to be limiting. Consumption data thresholds are described in further detail with respect to operation 704.

In operation 700, the apparatus 200 may include means, such as processor 220, communication interface 224, memory device 226, or the like, for performing machine learning based on the consumption data, the viewed content, and the new content.

Some example embodiments use a series of video content and associated consumption data as training input into a machine learning algorithm. The machine learning algorithm may be implemented using deep learning and/or recurrent neural networks (RNN). The learning is performed so that input is the received consumption data relating to other viewer(s)' consumption of the content, and the viewed content.

Example embodiments may perform the learning or training using a deep learning algorithm and/or recurrent neural network (RNN) architecture such as illustrated in FIG. 8. In some examples, content may be associated with a genre or other category, (e.g., documentary, sports, music, horror, etc.) and may train a neural network for each genre differently. RNNs such as the one depicted in FIG. 8 are described in further detail in http://colah.github.io/posts/2015-08-Understanding-LSTMs/. An input for training the algorithm is a tile (or any other spatial portion) of a particular frame or content for which the heat map or consumption data is known, and its associated heat map or consumption data, for each time t. When applying the algorithm to predict the heat map or consumption data for new content, the output is the associated predicted heat map, hm, or consumption data for the new content. Information from time t may be transferred to time t+1 through a loop, such that past viewed frames are added to the training data to update the model.

Example embodiments may model characteristics of the video content, which may include any characteristics indicative of a user focusing on particular areas. The characteristics may include but are not limited to objects of interest, people, activity, colors, lighting effects, motion and/or the like, for example.

As such, based on the machine learning algorithm, in operation 702, the apparatus 200 may include means, such as processor 220, user interface 222, communication interface 224, memory device 226, or the like, for predicting consumption data for another content based on the machine learning. In some examples, the consumption data may be predicted on a frame-by-frame basis. Predicting the consumption data for new content may be useful in applying operations of FIG. 3 in situations where no consumption data or little consumption data has been collected. Example embodiments may therefore still provide the dynamic encoding, pre-fetching, caching, and rendering with regard to different spatial areas as described herein, despite not having actual consumption data for the new content.

As shown by operation 704, apparatus 200 may include means, such as the processor 220, communication interface 224, memory device 226, or the like, for tracking the consumption data and in an instance a consumption data criterion is satisfied, switch from using predicted consumption data to actual consumption data.

According to example embodiments, upon initial processing of a video asset or content, a predictive heat map may be generated using the machine learning algorithm described above. Optimizations for variable encoding properties, caching priorities, and rendering priorities may be implemented accordingly. In some embodiments, as actual consumption data is collected, example embodiments determine to gradually use actual data to supplant the predicted data, according to a consumption data criterion.

For example, in determining encoding properties, example embodiments may calculate an error value on a periodic basis, such as every 30 seconds, indicating the error level between the predicted consumption data and the actual consumption data. Once this error value exceeds a specified threshold (e.g., consumption data criterion), and if the total demand for the asset is large enough to justify further processing, example embodiments may determine encoding properties based on actual data rather than predicted data.

In determining caching priorities and rendering priorities, once apparatus 200 obtains a total amount of consumption data samples that exceeds a certain predefined threshold (e.g., consumption data criterion), the actual aggregated consumption data rather than the predicted consumption data, may be used to drive caching priority and/or rendering optimizations.

As such, while processing new content, apparatus 200 may initially perform the operations of FIG. 2 by using predictive consumption data, but may switch to using actual consumption data once a consumption data criterion is satisfied.

Training for a Particular Viewer or Viewer Group

In some embodiments, optional operations for training according to a particular viewer or group of viewers may be performed. Apparatus 200 may include means, such as the processor 220, communication interface 224, memory device 226, or the like, for performing training for a particular viewer or group of viewers and tailoring predictive consumption data for the particular view or group of viewers.

The training may be performed as an individual viewer or a group, or type of viewer views content, such that their own personal or group viewing habits may be applied to the consumption data. The training may be performed such that the heat map or consumption data input is the predictive or actual consumption data of the particular viewer or viewer group for previously viewed content and/or frames.

In some examples, the training of consumption data for a particular viewer or group of viewers may occur in real-time or near real-time, as the viewer or groups view the content. In this regard, the training may be combined with machine learning such that the predictive consumption data may be tailored for the viewer and/or group of viewers as they view the content. In some examples, this may be advantageous during live streaming. During playback or streaming of content, example embodiments may dynamically update the model and perform the training incrementally, thereby improving the modeling of a user's preferences according to the viewed areas.

As another example, training the consumption data for a particular viewer or group of viewers may occur over time, as the viewer or group of viewers views multiple video assets, for example.

Example embodiments of apparatus 200 may therefore automatically identify and learn correlations and definitive characteristics of the content which users prefer to see, and model a viewer's preferences accordingly. Example embodiments may determine viewer preferences or habits to create consumption data and/or modify consumption data (e.g. heat maps) for particular users, such as individuals and/or group of viewers. For example, the predictions and/or calibrations may be performed for a particular single viewer or multiple users from which the training data was collected.

Example embodiments may perform the training based on a learning algorithm using an evolutionary neural network, similar to that of FIG. 8. Apparatus 200 may gather consumption data during playback of at least the first frame, or several frames of content for a particular viewer or group of viewers. After some consumption data is gathered, apparatus 200 may utilize the machine learning algorithm to process consumption data relative to the content and model the viewer preferences. Example embodiments may then determine dynamic encoding properties, caching priorities, and/or rendering priorities for subsequent frames, as in FIG. 2, based on the tailored consumption data. The frame may be streamed to a viewer and the process repeated.

Example embodiments may therefore dynamically determine encoding properties, caching priorities, rendering priorities, and/or the like for the particular viewer or group of viewers.

CONCLUSION

Example embodiments described herein provide numerous technical advantages. Video may be streamed or provided to users with a higher-quality viewing experience for users, at the same or lower bandwidth utilization than what otherwise may be achieved. Example embodiments may encode frequently viewed spatial portions of content at high resolutions and bit rates, and assign these frequently viewed portions higher caching priorities and rendering priorities. By dynamically determining such properties, example embodiments conserve bandwidth and optimize performance.

As described above, FIGS. 3 and 7 illustrate flowcharts of an apparatus 200, method, and computer program product according to an example embodiment of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 226 of an apparatus 200 employing an embodiment of the present invention and executed by a processor 220 of the apparatus 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

That which is claimed:

1. A method comprising:
    receiving at a server device, consumption data relative to spatial portions of content, wherein the consumption data indicates at least a spatial portion of video content that is viewed more frequently in comparison to at least another spatial portion viewed less frequently, and wherein each spatial portion is defined by a subset of pixels;
    determining, with at least a processor of the server device, a value of at least one encoding property associated with at least one spatial portion of the content, wherein the encoding property value depends upon the consumption data, and wherein the at least one encoding property comprises at least one of a quality setting or bitrate;
    encoding the content, in at least a memory device, based on the at least one encoding property value; and
    causing transmission of the encoded content over a network for rendering on a user device, wherein at least one of the transmission or the rendering is dependent on the at least one encoding property.

2. The method of claim 1, wherein the consumption data comprises temporal consumption data relative to the spatial portions of the content and the method further comprises varying the at least one encoding property value by frame.

3. The method of claim 1, further comprising:
    determining at least one of a caching priority or pre-fetching priority of the at least one spatial portion depending upon the consumption data.

4. The method of claim 1, further comprising:
    determining a rendering priority of the at least one spatial portion depending upon the consumption data.

5. The method of claim 1, wherein the consumption data is generated based on received viewing data associated with at least multiple users or multiple devices.

6. The method of claim 1, wherein the method further comprises:
    performing machine learning based on the consumption data to predict consumption data for other content.

7. The method of claim 6, further comprising:
    tracking consumption data and in an instance a consumption data criterion is satisfied, switching from using the predicted consumption data to actual consumption data.

8. The method of claim 1, wherein the consumption data is associated with previously viewed frames of the content from at least one of multiple users or multiple devices, and the method further comprises:
    determining predicted consumption data of unviewed frames of the content based on at least content of the unviewed frames and the consumption data associated with the previously viewed frames.

9. An apparatus comprising at least one processor and at least one memory including computer program code, the at least one memory and the computer program code configured to, with the processor, cause the apparatus to at least:
    receive consumption data relative to spatial portions of content, wherein the consumption data indicates at least a spatial portion of video content that is viewed more frequently in comparison to at least another spatial portion viewed less frequently, and wherein each spatial portion is defined by a subset of pixels;
    determine a value of at least one encoding property associated with at least one spatial portion of the content, wherein the encoding property value depends upon the consumption data, and wherein the at least one encoding property comprises at least one of a quality setting or bitrate;
    encode the content based on the at least one encoding property value; and
    cause transmission of the encoded content over a network for rendering on a device, wherein at least one of the transmission or the rendering on the device is dependent on the at least one encoding property.

10. The apparatus of claim 9, wherein the consumption data comprises temporal consumption data relative to the spatial portions of the content and the method further comprises varying the at least one encoding property value by frame.

11. The apparatus of claim 9, wherein the at least one memory and the computer program code are further configured to cause the apparatus to at least:
    determine at least one of a caching priority or pre-fetching priority of the at least one spatial portion depending upon the consumption data.

12. The apparatus of claim 9, further comprising:
    determine a rendering priority of the at least one spatial portion depending upon the consumption data.

13. The apparatus of claim 9, wherein the consumption data is generated based on received viewing data associated with at least multiple users or multiple devices.

14. The apparatus of claim 9, wherein the at least one memory and the computer program code are further configured to cause the apparatus to at least:
    perform machine learning based on the consumption data to predict consumption data for other content.

15. The apparatus of claim 14, wherein the at least one memory and the computer program code are further configured to cause the apparatus to at least:
    track consumption data and in an instance a consumption data criterion is satisfied, switch from using the predicted consumption data to actual consumption data.

16. The apparatus of claim 9, wherein the consumption data is associated with previously viewed frames of the content from at least one of multiple users or multiple devices, and the at least one memory and the computer program code are further configured to cause the apparatus to at least:
    determine predicted consumption data of unviewed frames of the content based on at least content of the unviewed frames and the consumption data associated with the previously viewed frames.

17. A computer program product comprising at least one non-transitory computer-readable storage medium having computer-executable program code instructions stored therein, the computer-executable program code instructions comprising program code instructions to:
    receive consumption data relative to spatial portions of content, wherein the consumption data indicates at least a spatial portion of video content that is viewed more frequently in comparison to at least another spatial portion viewed less frequently, and wherein each spatial portion is defined by a subset of pixels;
    determine a value of at least one encoding property associated with at least one spatial portion of the content, wherein the encoding property value depends upon the consumption data, and wherein the at least one encoding property comprises at least one of a quality setting or bitrate;
    encode the content based on the at least one encoding property value; and cause transmission of the encoded content over a network for rendering on a device, wherein at least one of the transmission or the rendering on the device is dependent on the at least one encoding property.

18. The computer program product of claim 17, wherein the consumption data comprises temporal consumption data relative to the spatial portions of the content and the method further comprises varying the at least one encoding property value by frame.

19. The computer program product of claim 17, wherein the computer-executable program code instructions further comprise program code instructions to:

determine at least one of a caching priority or pre-fetching priority of the at least one spatial portion depending upon the consumption data.

20. The computer program product of claim 17, wherein the consumption data is generated based on received viewing data associated with at least multiple users or multiple devices.

* * * * *